United States Patent [19]
Morey et al.

[11] Patent Number: 5,459,658
[45] Date of Patent: Oct. 17, 1995

[54] AUTOMATIC TRANSMISSION WITH PROGRAMMABLE SHIFTPOINTS

[75] Inventors: Stephen J. Morey, Peoria; Rick D. Vance, Washington; Steven T. Ufheil, Peoria, all of Ill.

[73] Assignee: Caterpillar Inc., Peoria, Ill.

[21] Appl. No.: 902,217

[22] Filed: Jun. 22, 1992

[51] Int. Cl.⁶ .................................................. B60K 31/00
[52] U.S. Cl. ........................ 364/424.1; 477/65; 477/129; 477/120; 477/102; 477/73; 477/63; 74/335; 74/336 R; 395/900; 395/905
[58] Field of Search ................................ 364/424.1, 431, 364/426; 74/866, 867, 335, 336 R, 473 R; 192/0.052, 0.075, 0.09; 477/63, 65, 120, 121, 129, 155, 904, 52, 68, 143, 102, 109, 131, 132, 149, 163, 101, 98; 395/73–75

[56] References Cited

U.S. PATENT DOCUMENTS

| | | | |
|---|---|---|---|
| 4,414,863 | 11/1983 | Heino | 477/63 |
| 4,425,620 | 1/1984 | Batcheller et al. | 364/424.1 |
| 4,732,055 | 3/1988 | Tateno et al. | 364/424.1 |
| 4,807,497 | 2/1989 | Yasue et al. | 477/98 |
| 4,838,125 | 6/1989 | Hamano et al. | 477/129 |
| 4,838,126 | 6/1989 | Wilfinger et al. | 477/129 |
| 4,933,851 | 6/1990 | Ito et al. | 364/424.1 |
| 5,079,704 | 1/1992 | Sakai et al. | 364/424.1 |
| 5,129,288 | 7/1992 | Sasaki et al. | 364/424.1 |
| 5,151,858 | 9/1992 | Milunas et al. | 364/424.1 |
| 5,157,607 | 10/1992 | Stainton et al. | 364/424.1 |
| 5,178,042 | 1/1993 | Moroto et al. | 477/65 |

*Primary Examiner*—Gary Chin
*Assistant Examiner*—Jacques H. Louis-Jacques
*Attorney, Agent, or Firm*—R. Carl Wilbur; Kirk A. Vander Leest

[57] ABSTRACT

An apparatus is provided for use in a vehicle having an engine driven transmission which includes a plurality of gear ratios. The apparatus includes a sensor adapted to sense an operating parameter and responsively produce a parameter signal. A memory device includes a custom shiftpoint map for storing data which relates transmission gear ratio to the parameter signal. A programming device for allowing the custom shiftpoint map to be reprogrammed during vehicle operation. A controller is adapted to receive the vehicle speed signal, retrieve data from the custom shiftpoint map, and process the retrieved data and the parameter signal to produce a transmission control signal. An actuator is adapted to receive the transmission control signal and responsively control the transmission gear ratio.

31 Claims, 2 Drawing Sheets

5,459,658

AUTOMATIC TRANSMISSION WITH PROGRAMMABLE SHIFTPOINTS

TECHNICAL FIELD

This invention relates generally to automatic transmissions and, more particularly, to an electronic control system for automatic transmissions which allows a vehicle operator to controllably program the transmission shiftpoints.

BACKGROUND ART

Electronic transmission control systems for vehicles are generally well known in the art. In construction vehicles such control systems typically include manual and automatic modes of operation. In the manual mode, a transmission gear ratio is controlled in accordance with the position of a manual gear selector such as a gear shift handle or lever. Conversely, in the automatic mode, gear ratio is automatically controlled in accordance with a predetermined shiftpoint map which relates gear ratio to sensed operating parameters, such as vehicle speed and/or engine speed.

In many vehicles, it is desirable that the operator utilize the automatic shifting mode, thereby freeing his/her hands for controlling implement control levers, for example. However, often operators are forced to utilize the manual shifting mode because the preprogrammed shift points are inappropriate for operating conditions or due to operator preference.

Systems are available which make it possible to reprogram the factory shiftpoints using a service tool. However, such systems are undesirable because they require a special service tool and a trained technician to operate the service tool. Moreover, such systems result in excessive machine downtime because they don't permit the shiftpoints to be reprogrammed during vehicle operation.

Additionally, in the automotive field, it is known to provide a vehicle with two or more types of shifting patterns such as an economy shift pattern and a performance shift pattern. One such system is generally disclosed in U.S. Pat. No. 4,807,497 which issued on Feb. 28, 1989 to Yasue et al. However, such systems are limited in that they only provide preselected shiftpoint maps. As such, these systems are unable to adequately compensate for all changes in operating conditions.

The present invention is directed to overcoming the problems as set forth above.

DISCLOSURE OF THE INVENTION

An apparatus is provided for use in a vehicle having an engine driven transmission which includes a plurality of gear ratios. The apparatus includes a sensor adapted to sense an operating parameter and responsively produce a parameter signal. A memory device includes a custom shiftpoint map for storing data which relates transmission gear ratio to the parameter signal. A programming device allows the custom shiftpoint map to be reprogrammed during vehicle operation. A controller is adapted to receive the vehicle speed signal, retrieve data from the custom shiftpoint map, and process the retrieved data and the parameter signal to produce a transmission control signal. An actuator is adapted to receive the transmission control signal and responsively control the transmission gear ratio.

BEST MODE FOR CARRYING OUT THE INVENTION

Figure 1:
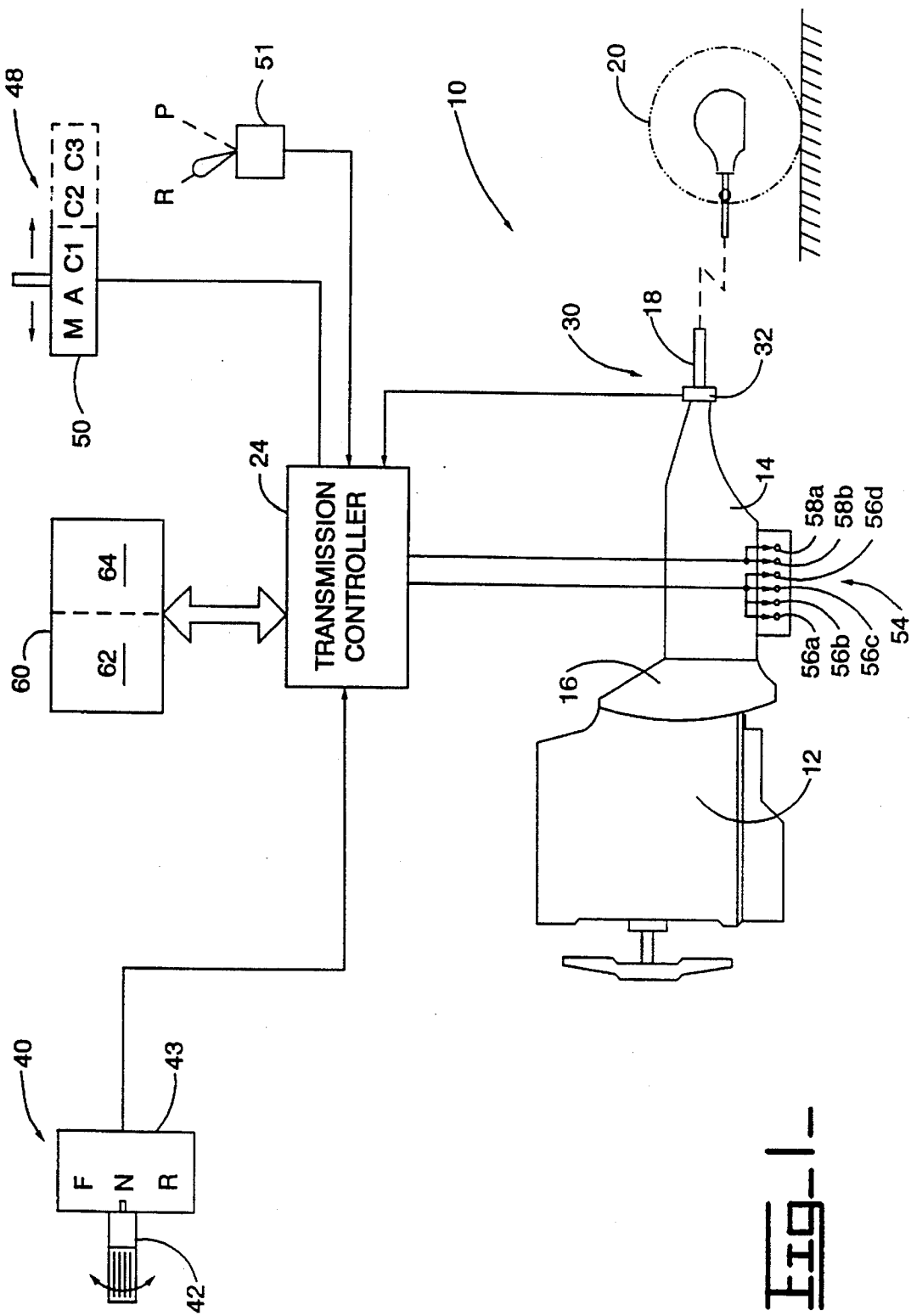
FIG. 1 is a schematic illustration of a preferred embodiment of the present transmission control system.

Referring now to FIG. 1, an embodiment of the immediate invention will be described in connection with a drive system 10 for a construction vehicle, such as a wheel type loader. It should be appreciated that the present invention is readily adaptable for use in other vehicles such as automobiles. The drive system 10 includes an engine 12 and a transmission 14 having a plurality of gear ratios. For illustration purposes, the present invention is described in connection with a transmission 14 which includes four forward and four reverse gear ratios. However, it should be appreciated that the present invention can be adapted to transmissions having different gear ratio configurations. The transmission 14 has an input connected to and driven by the engine 12 through a torque converter 16. An output shaft 18 of the transmission is connected to a vehicle drive wheel 20 such that engine output power or torque is transmitted to the wheel 20 for propelling the vehicle.

A transmission controller 24 is provided for controlling transmission gear ratio in response to sensed vehicle parameters. In the preferred embodiment, the controller 24 is implemented employing a microprocessor with appropriate input and output signal conditioning circuits (not shown) as is well known in the art. The microprocessor is programmed to produce transmission control signals TRANSCTL for controlling transmission's direction and gear ratio in response to sensed input parameters, as is explained below. Preferably the microprocessor is a series MC68HC11 microprocessor as manufactured by Motorola, Inc. of Schaumburg, Ill.; however, numerous other commercially available devices could readily be adapted to perform the functions of the controller 24.

A parameter sensor 30 is provided for sensing an operating parameter and responsively producing a parameter signal. In the preferred embodiment, the parameter signal is responsive to vehicle speed and, in particular, transmission input speed. For this purpose a vehicle speed sensor 32 is adapted to sense a parameter indicative of vehicle speed and responsively produce a vehicle speed signal. Preferably the vehicle speed sensor 32 is in the form of a magnetic speed pickup which is adapted to sense the rotational speed of the transmission output shaft 18 and responsively produce the vehicle speed signal. The controller 24 is adapted to receive the vehicle speed signal and produce a transmission input speed signal in response to the vehicle speed signal and the current transmission gear ratio, as would be apparent to one skilled in the art. It should be appreciated that the vehicle speed sensor 32 can be any type of sensor which accurately produces an electrical signal responsive to the speed of the output shaft 18. Additionally, it is foreseeable that the function of the vehicle speed sensor 32 could be performed by sensing other parameters such as transmission input speed.

A gear selector 40 is movable to a plurality of locations for indicating a desired transmission gear ratio and direction of travel. The gear selector 40 includes a handle or lever 42 which is rotatably positionable at any of four speed settings for indicating the first, second, third and fourth gear ratios, respectively. The handle 42 is also positionable at any one of three directional positions (F,N,R) for indicating forward, neutral and reverse directions of travel. It should be appreciated that the gear selector 40 could be embodied in any device or combination of devices capable of indicating a desired gear ratio and direction of travel. For example, the gear selector 40 could include two levers, one for indication a desired gear ratio and one for indicating a desired direction of travel.

A selector sensor 43 is adapted to sense the position of the gear handle 42 and produce a desired gear ratio signal which corresponds to a desired transmission gear ratio and direction of travel. In the preferred embodiment, the selector sensor 43 is in the form of a plurality of switches (not shown) adapted to produce an 8 bit output signal in accordance with the following table:

| Handle Setting | OUTPUT BITS | | | | | | | |
|---|---|---|---|---|---|---|---|---|
| | FWD | FWDP | REV | REVP | SP1 | SP2 | SP3 | SP4 |
| FWD1 | GND | +B | | | GND | | | |
| FWD2 | GND | +B | | | | GND | | |
| FWD3 | GND | +B | | | | | GND | |
| FWD4 | GND | +B | | | | | | GND |
| NEUTRAL | | | | | | | | GND |
| REV1 | | | GND | +B | GND | | | |
| REV2 | | | GND | +B | | GND | | |
| REV3 | | | GND | +B | | | GND | |
| REV4 | | | GND | +B | | | | GND |

In Table 1, FWD1–4 and REV1–4 represent the four forward and reverse gear ratios, GND represents ground, +B represent plus battery potential, bits FWDP and REVP represent forward and reverse parity, bits SP1–SP4 are four speed bits corresponding to the four gear ratios. As can be seen, the selector sensor 43 produces a unique output signal in each handle position. For example, when the handle is in the forward direction and the first speed setting, the FWD bit is pulled to ground, the FWDP bit is connected to B, the first speed bit is connected to ground and the remaining five bits float. The controller 24 is adapted to receive the output signal from the selector sensor 43 and determine the desired gear ratio in a manner well known in the art.

A mode selector 48 is provided for controllably producing one of a custommode signal, a programmode signal, an automode signal or a manualmode signal. The mode selector 48 is preferably in the form of two multiple position switches 50,51. The first switch 50 is movable to first position M where the manualmode signal is produced, a second position A where the automode signal is produced and at least one additional position (C1–C3) where a custom shiftpoint map signal is produced. The present invention is described in connection with a single custom shiftpoint map which can be programmed during vehicle operation, as explained below. However, in some instances it may be desirable to provide more than one custom shiftpoint map. For this purpose, the first switch is illustrated as having positions C2,C3 which can be used to select additional custom shiftpoint maps. The second switch 51 is movable between a first position R where a run signal is produced and a second position P where a program signal is produced. The custommode signal as referred to herein corresponds to the simultaneous production of the run signal and one of the custom shiftpoint map signals. Similarly, the programmode signal corresponds to the simultaneous production of the programmode and one of the custom shiftpoint map signals.

It should be appreciated that the mode selector 48 could take numerous other forms. For example, the mode selector 48 can be provided in the form of a single multiple position switch (not shown) which is adapted to produce a different one of the signals in each position. Alternatively, the mode selector 48 can be embodied in a combination of a two-position selector switch and a harness code plug (not shown). In this alternate embodiment, the selector switch is movable to two positions for respectively producing the automode and manualmode signals. The custommode and programmode signals are controllably produced in response to the harness code indicated by the harness plug. This alternate embodiment is preferable when it is desirable to limit use of the custom and program modes.

A transmission actuator 54 is provided for receiving transmission control signals and responsively controlling the transmission gear ratio. For this purpose, the transmission 14 includes a plurality of speed solenoid 56a–d which are adapted to receive electrical signals from the controller 24 and responsively control the transmission gear ratio. The transmission 14 is also provided with forward and reverse solenoids 58a,b which are adapted to receive forward and reverse signals from the controller 24 and responsively control the direction of the transmission. In the preferred embodiment the solenoids are energized in accordance with the following table:

| TRANSCTL | (SOLENOIDS) | | | | | |
|---|---|---|---|---|---|---|
| | FWD | REV | SP1 | SP2 | SP3 | SP4 |
| FWD1 | ON | | ON | | | |
| FWD2 | ON | | | ON | | |
| FWD3 | ON | | | | ON | |
| FWD4 | ON | | | | | ON |
| NEUTRAL | | | | | | ON |
| REV1 | | ON | ON | | | |
| REV2 | | ON | | ON | | |
| REV3 | | ON | | | ON | |
| REV4 | | ON | | | | ON |

The controller 24 is adapted to receive the manualmode, automode, programmode, custommode, parameter (i.e., vehicle speed) and desired gear ratio signals. The controller 24 operates in a manual mode when the manualmode signal is received, an automatic mode when the automode signal is received, a program mode when the programmode signal is received, and a custom mode when the custommode signal is received.

In the manual mode the gear ratio is controlled in response to the position of the gear selector 40. More specifically, the controller 24 is operative to produce a transmission control signal which corresponds to the desired gear ratio signal. Each time the position of the gear selector 40 is changed, the transmission is shifted accordingly. In this manner the transmission 14 to be operated in much the same manner as a standard transmission works in an automobile.

In the automatic mode, gear shifts are affected in response to sensed operating parameters, such as vehicle speed, and in accordance with a stored data which relates the sensed parameter to transmission gear ratio. For this purpose, a memory device 60 is provided for storing a default shiftpoint map 62 which relates transmission gear ratio to the parameter signal. Preferably, the default shiftpoint map 62 is stored in a permanent memory device such as a ROM; however, it should be apparent that a semi-permanent memory device such as an EEPROM could be used for this purpose. As was mentioned above, the parameter signal is preferably responsive to vehicle speed and transmission input speed in particular. While the present invention is described in connection with shiftpoint maps which are responsive to transmission input speed, it should be appreciated that the shiftpoint maps could be responsive to other parameters such as engine speed, throttle opening, engine load and/or transmission output speed without departing from the scope of the present invention.

The default shiftpoint map 62 provides upshift and downshift speeds for each gear ratio corresponding to the transmission input speed at which upshifts and downshifts are to occur in a respective gear ratio. The controller 24 is operative to retrieve the upshift and downshift speeds for the current gear ratio from the default shiftpoint map 62. The controller 24 produces a transmission input speed signal which corresponds to the product of the current gear ratio and the transmission output speed, produces an upshift signal if the transmission input speed signal above the retrieved upshift speed and a downshift signal if the transmission input speed signal is below the retrieved downshift speed. The maximum gear allowed is limited to the gear desired gear signal as produced by the selector sensor 93. For example, if the handle 42 is in the third gear position, automatic shifting is performed up to and including the third gear ratio. The upshift and downshift signals are delivered to the transmission actuator 54 which responsively upshifts or downshifts the transmission 14 one gear ratio from the present gear ratio. It should be appreciated that in the system shown in FIG. 1 upshifts and downshifts are effected by deenergizing the shift solenoid for the old gear and energizing the shift solenoid for the new gear in accordance with table 2.

The memory device 60 also includes at least one custom shiftpoint map 64 for storing data which relates the parameter signal to transmission gear ratio. Preferably, the custom shiftpoint map 64 is stored in a semi-permanent memory device such as an EEPROM. In the preferred embodiment, this map stores upshift and downshift transmission input speeds for each gear ratio. The program mode allows the custom shiftpoint map 64 to be controllably reprogrammed during vehicle operation in accordance with operator preference and/or working conditions. In some applications it might be desirable to provide more than one custom shiftpoint map 64. This can readily be accomplished by providing additional positions on the switch 50 as indicated by C2 and C3. The number of custom shiftpoint maps 64 which can be provided is only limited by the amount of memory available in the system, as would be appreciated by one skilled in the art.

In the programmode the controller 24 is operative to record the value of the parameter signal for each shift which occurs. More specifically, the controller 24 records the transmission input speed signal for each upshift and downshift which occurs during the programmode. Preferably, the signal is recorded at the initiation of a shift; however, in some applications it may be desirable to record the signal at a different point during the shift. The controller 24 also produces average upshift and downshift speed signals responsive to averages of the recorded upshift and downshift speeds for each gear ratio. Preferably, the average signals are produced in response to a running average of the recorded upshift and downshift speeds in each gear ratio. If this method is used, the controller 24 updates the custom shiftpoint map 64 after each execution of the control loop. Alternatively, the average signals can be produced in response to the average of a predetermined number of upshifts and downshifts in each gear ratio. If this method is used, the controller 24 updates the custom shiftpoint map 64 after the occurrence of the predetermined number of shifts.

The controller 24 is further programmed to prevent the custom shiftpoint map 64 from being updated if the new data will result in engine overspeeding during downshifts. This can be achieved by comparing the magnitude of the average downshift speed signal to a preselected value for each gear ratio. The preselected value is empirically determined and corresponds to a transmission input speed or vehicle speed which will overspeed the engine in a respective gear ratio.

The custom mode operates in much the same manner as the automatic mode except that controller 24 retrieves data from one of the custom shiftpoint maps 64 as opposed to the default shiftpoint map 62. More specifically, the controller 24 is operative to retrieve upshift and downshift speeds for the current gear ratio from the selected custom shiftpoint map 64. The controller 24 produces an upshift signal if the transmission input speed signal is above the retrieved upshift speed and a downshift signal if it is below the retrieved downshift speed. The maximum gear ratio allowed in the custom mode is controlled in response to the position of the handle 42, as was explained above in connection with the automatic mode.

It should be appreciated that the present invention could readily be implemented using only custom shiftpoint maps and not providing a default shiftpoint map 62. However, providing two shiftpoint maps is preferred so that a shiftpoint map corresponding to the manufacturer's preferred shifting pattern is always accessible by the controller 24.

Figure 2:
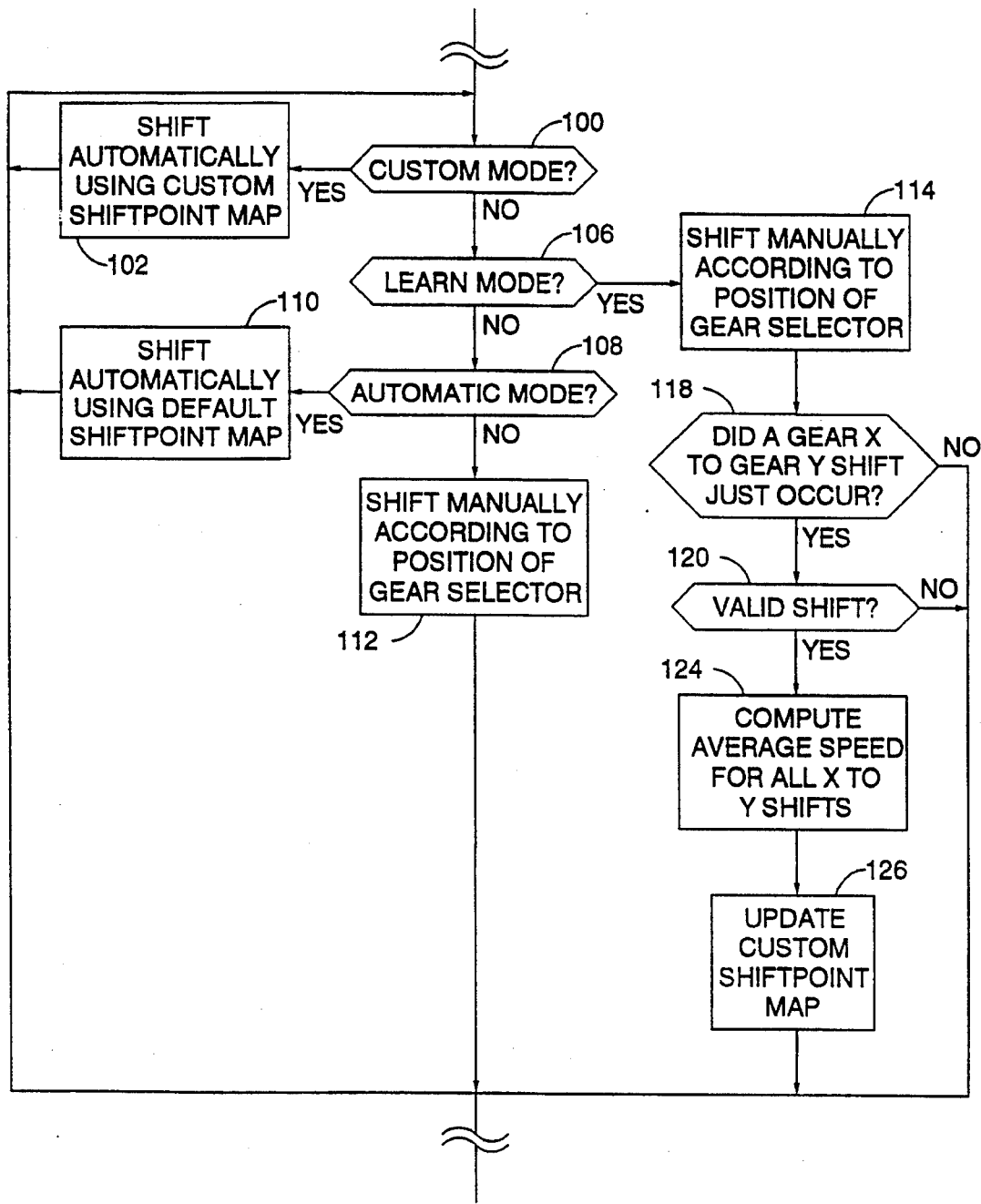
FIG. 2 is a software flowchart for practicing certain aspects of the present invention.

Referring now to FIG. 2, an embodiment of software for programming the controller 24 in accordance with certain aspects of the immediate invention is explained. FIG. 2 is a flowchart illustrating a computer software program for implementing the preferred embodiment of the present invention. The program depicted in this flowchart is particularly well adapted for use with the microprocessor and associated components described above, although any suitable microprocessor may be utilized in practicing an embodiment of the present invention. This flowchart constitutes a complete and workable design of the preferred software program, and has been reduced to practice on the series MC68HC11 microprocessor system. The software program may be readily coded from these detailed flowcharts using the instruction set associated with this system, or may be coded with the instructions of any other suitable conventional microprocessors. The process of writing software code from flowcharts such as these is a mere mechanical step for one skilled in the art.

Initially, in the block 100, the controller 24 determines if the custom mode is requested by sensing for the presence of the custommode signal, (i.e. simultaneous production of the run signal and one of the custom shiftpoint map signals.) If the custommode signal is detected, the controller enters the custom mode in the block 102. In the custom mode shifts to be performed in accordance with the custom shiftpoint map 64, as described above. However, if no data is stored in the custom shiftpoint map 64, the controller 24 retrieves data from the default shiftpoint map 62. This situation can occur if the program mode has never been executed or if the custom shiftpoint map 64 is accidentally erased.

If the custom mode signal is not detected, control is passed to the block 106. In the block 106, the controller 24 checks for the presence of the programmode signal, (i.e., simultaneous production of the program signal and one of the custom shiftpoint map signals.) If the programmode signal is not detected, control is passed to the block 108 where the controller 24 checks for the presence of the automode signal. If the automode signal is detected, control is passed to the block 110 where the control enters the automatic mode. In the automatic mode shifts are performed in accordance with the default shiftpoint map 62. Conversely, if the automode signal is not detected in the block 108, control is passed to the block 112 where the controller 24 enters the manual mode. In the manual mode, transmission gear ratio is controlled in response to the desired gear ratio signal as produced by the gear selector 40.

If the programmode signal is detected in block 106, control is passed to the block 114 where the controller 24 enters the program mode. In the block 114, the transmission control signal is produced in accordance with the desired gear ratio signal. Control is then passed to the block 118 where it is determined if a X to Y gear shift has occurred since entering the program mode, where X represents the gear ratio prior to the shift and Y represents the gear ratio after the shift. If a gear shift has not occurred, control is returned to the block 100.

However, if a shift did occur, control is passed to the block 120 where it is determined if the shift meets predetermined safety and validity requirements. If the gear shift fails the validity tests, control is returned to the block 100. Conversely, if the shift was valid control is passed to the block 124. In the block 124 the controller 24 updates the average signal for the X to Y shift which just occurred. More specifically, running averages are maintained for transmission input speed during upshifts and downshifts in each gear ratio which occur during the program mode. When a shift occurs, the controller updates the appropriate average in response to the transmission input speed sensed at the start of the shift. For example, if there has been an upshift from third gear to fourth gear, the average signal for the third gear upshift speed is recalculated.

Next control is passed to the block 126 where the controller 24 updates the appropriate custom shiftpoint map 64 with the average signals. This is accomplished by overwriting the existing data stored in the map 64 with the average signals which have been recalculated. In FIG. 2, the control routine illustrated as operating to update the custom shiftpoint map 64 during each execution of the control loop. This is the preferred method if running averages are maintained for each gear ratio upshift and downshift speed. Alternatively, the average signals can be calculated after a predetermined number of upshifts and downshifts in each gear. If this method is used, the custom shiftpoint map 64 is not updated until the predetermined number of shifts occur. It should be noted that other statistics besides averages could be used. For example, it might be desirable to eliminate the maximum and minimum values or extreme values prior to calculating the averages.

INDUSTRIAL APPLICABILITY

It is felt that an ideal application for the present invention is a construction vehicle such as a wheel type loader. In such an environment, the present invention is beneficial because it allows the transmission shiftpoints to be tailored in accordance with operator preference and/or the operating conditions. By providing this feature, the present invention encourages the operator to use the custom mode as opposed to manual mode. In the custom mode shifts occur automatically, thereby leaving the operator's hand free for manipulating other control elements, such as implement control levers.

When it is desirable to reprogram one of the custom shiftpoint maps 64, the switch 51 is moved to the program mode position and the switch 50 is positioned to select one of the custom shiftpoint maps 64. Production of the programmode signal causes the controller 24 to enter the program mode. The operator then performs work cycles while manually controlling the gear ratio using the gear selector 40. Each time the operator changes the gear ratio, the controller 24 records the value of the transmission input speed signal. Averages of the transmission input speed for upshifts and downshifts are maintained for each gear ratio and the controller 24 updates the appropriate custom shiftpoint map 64 with the recalculated averages. When the switch 51 is subsequently moved to the run position, the controller 24 enters the custom mode. In the custom mode, shifts are effected in accordance with the updated custom shiftpoint map 64.

Other aspects, objects, and advantages of this invention can be obtained from a study of the drawings, the disclosure and the appended claims.

We claim:

1. An apparatus for use in a vehicle having an engine driven transmission which includes a plurality of gear ratios, comprising:

a sensor adapted to sense an operating parameter and responsively produce a parameter signal;

a memory device including a custom shiftpoint map for storing data which relates transmission gear ratio to the parameter signal;

programming means for allowing the custom shiftpoint map to be reprogrammed during vehicle operation;

a controller adapted to receive the parameter signal, retrieve data from the custom shiftpoint map, and process the retrieved data and the parameter signal to produce a transmission control signal; and an actuator adapted to receive the transmission control signal and responsively control the transmission gear ratio.

2. An apparatus as set forth in claim 1 including:

a mode selector adapted to controllably produce one of an automode signal and a custommode signal;

wherein the memory device further includes a default shiftpoint map for storing data which relates transmission gear ratio to the parameter signal; and wherein the controller is further adapted to receive the automode and custommode signals, retrieve data from the default shiftpoint map when the automode signal is received, retrieve data from the custom shiftpoint map when the custommode signal is received, and process the retrieved data and the parameter signal to produce a transmission control signal.

3. An apparatus as set forth in claim 1 including:

a mode selector adapted to controllably produce a programmode signal;

a gear selector movable to a plurality of locations for indicating a desired gear ratio;

a sensor adapted to sense the location of the gear selector and produce a desired gear ratio signal;

wherein the custom shiftpoint map includes upshift and downshift values for each gear ratio which correspond to the magnitude of the parameter signal at which upshifts and downshifts are to occur in a respective gear ratio; and wherein the controller is adapted to receive the program mode and desired gear ratio signals and operate in a program mode when the programmode signal is received, the program mode being operative to produce a transmission control signal responsive to the desired gear ratio signal, record the magnitude of the parameter signal for each upshift and downshift which occurs, produce average upshift and downshift signals responsive to averages of the recorded parameter signals for each gear ratio, and update the custom shiftpoint map with the average signals.

4. An apparatus as set forth in claim 3 wherein:

the mode selector is adapted to controllably produce a custommode signal; and the controller is adapted to receive the custommode and responsively enter a custom mode, the custommode being operative to upshift and downshift values for the current gear ratio from the custom shiftpoint maps and process the retrieved values and the parameter signal to produce the transmission control signal.

5. An apparatus as set forth in claim 4 wherein the parameter signal corresponds to a transmission input speed.

6. An apparatus as set forth in claim 4 wherein the parameter signal corresponds to a transmission output speed.

7. An apparatus as set forth in claim 3 wherein the average signals are produced after a predetermined number of upshifts and downshifts in each gear ratio.

8. An apparatus as set forth in claim 3 wherein the average signals are produced in response to running averages of the recorded upshift and downshift speeds in each gear ratio.

9. An apparatus as set forth in claim 1 wherein data is not stored in the custom shiftpoint map if said data will overspeed the engine during shifts.

10. An apparatus as set forth in claim 1, wherein there are a plurality of controllably selectable custom shiftpoint maps.

11. An apparatus for use in a vehicle having an engine driven transmission which includes a plurality of gear ratios, comprising:

a speed sensor adapted to sense a parameter indicative of vehicle speed and responsively produce a vehicle speed signal;

a mode selector adapted to controllably produce one of an automode signal and a custommode signal;

a memory device having default and custom shiftpoint maps for storing upshift and downshift speeds for each gear ratio;

programming means for allowing the operator to program the custom shiftpoint map during vehicle operation;

a controller adapted to receive the vehicle speed, automode and custommode signals, retrieve upshift and downshift speeds for the current gear ratio from the default shiftpoint map when the automode signal is received, retrieve upshift and downshift speeds for the current gear ratio from the custom shiftpoint map when the custommode signal is received, produce an upshift signal if a signal responsive to the vehicle speed signal is above the retrieved upshift speed, and produce a downshift signal if a signal responsive to the vehicle speed signal is below the retrieved downshift speed; and an actuator adapted to receive the upshift and downshift signals and responsively control the transmission gear ratio.

12. An apparatus as set forth in claim 11 including:

a gear selector movable to a plurality of locations for indicating a desired gear ratio;

a sensor adapted to sense the position of the gear selector and produce a desired gear ratio signal;

wherein the mode selector further controllably produces a programmode signal; and wherein the controller is adapted to receive the program mode and desired gear ratio signals and operate in a program mode when the programmode signal is received, the program mode being operative to produce a transmission control signal responsive to the desired gear ratio signal, record a signal responsive to the vehicle speed signal for each upshift and downshift which occurs, produce average upshift and downshift speed signals responsive to the recorded signals for each gear ratio, and update the custom shiftpoint map with the average upshift and downshift speed signals.

13. An apparatus as set forth in claim 12 wherein the signal responsive to vehicle speed corresponds to transmission input speed.

14. An apparatus as set forth in claim 12 wherein the signal responsive to vehicle speed corresponds to transmission speed.

15. An apparatus as set forth in claim 12 wherein the average signals are produced after a predetermined number of upshifts and downshifts in each gear ratio.

16. An apparatus as set forth in claim 12 wherein the average signals are produced in response to running averages of the recorded values for upshifts and downshifts in each gear ratio.

17. An apparatus as set forth in claim 12 wherein the custom shiftpoint map is not updated if the new data will overspeed the engine during shifts.

18. An apparatus for use in a vehicle having an engine driven transmission which includes plurality of gear ratios, comprising:

a speed sensor adapted to sense a parameter indicative of vehicle speed and responsively produce a vehicle speed signal;

gear selector movable to a plurality of locations for indicating a desired gear ratio;

a sensor adapted to sense the position of the gear selector and produce a desired gear ratio signal;

a mode selector adapted to controllably producing one of a custommode signal and a programmode signal;

a memory device having a custom shiftpoint map being adapted to provide an upshift speed and a downshift speed for each gear ratio;

a controller adapted to receive the programmode, custommode, vehicle speed and desired gear ratio signals, operate in a program mode when the program mode signal is received and a custom mode when the custommode signal is received, the program mode being operative to produce a transmission control signal responsive to the desired gear ratio signal, record a signal responsive to the vehicle speed signal for each upshift and downshift which occurs, produce average upshift and downshift speed signals responsive to averages of the recorded signals for each gear ratio, and update the custom shiftpoint map with the average upshift and downshift speed signals, the custom mode being operative to retrieve upshift and downshift speeds from the custom shiftpoint map for the current gear ratio, and process the retrieved data and a signal responsive to the vehicle speed signal to produce a transmission control signal; and an actuator adapted to receive the upshift and downshift signals and responsively control the transmission gear ratio.

19. An apparatus as set forth in claim 18 wherein;

the mode selector is further adapted to controllably produce an automode signal;

the memory device includes a default shiftpoint map adapted to provide upshift speed and downshift speed for each gear ratio; and the controller is adapted to receive the automode signal and operate in an automatic mode, the automatic mode being operative to retrieve data from the default shiftpoint map and process the retrieved data and a signal responsive to the vehicle speed signal to produce a transmission control signal.

20. An apparatus as set forth in claim 19 wherein:

the mode selector is adapted to controllably produce a manualmode signal; and the controller is adapted to receive the manualmode signal and operate in an manual mode, the manual mode being operative to produce transmission control signals responsive to the desired gear ratio signal.

21. An apparatus as set forth in claim 20 wherein the signal responsive to vehicle speed corresponds to transmission input speed.

22. An apparatus as set forth in claim 20 wherein the signal responsive to vehicle speed corresponds to transmission output speed.

23. An apparatus as set forth in claim 22 wherein the average signals are produced after a predetermined number of upshifts and downshifts in each gear ratio.

24. An apparatus as set forth in claim 22 wherein the average signals are produced in response to running averages of the recorded upshift and downshift speeds in each gear ratio.

25. An apparatus as set forth in claim 24 wherein the custom shiftpoint map is not updated if the new data will result in engine overspeeding during downshifts.

26. An apparatus as set forth in claim 18 wherein:

the mode selector is adapted to controllably produce a manualmode signal; and the controller is adapted to receive the manualmode signal and operate in an manual mode, the manual mode being operative to produce transmission control signals responsive to the desired gear ratio signal.

27. An apparatus as set forth in claim 25 wherein there are a plurality of controllably selectable custom shiftpoint maps.

28. A method for use in a vehicle having an engine driven transmission which includes plurality of gear ratios, a sensor adapted to sense an operating parameter and responsively produce a parameter signal, a shiftpoint map for storing data which relates transmission gear ratio to the parameter signal, a gear selector movable to a plurality of locations for indicating a desired gear ratio, and a sensor adapted to sense the position of the gear selector and produce a desired gear ratio signal, comprising the steps of:

controllably producing one of a custommode signal and a programmode signal;

operating in a program mode in response to programmode signal, the program mode being operative for producing a transmission control signal responsive to the desired gear ratio signal, recording the value of the parameter signal for each gear change, and updating the shiftpoint map with the recorded values;

operating in a custom mode in response to the custommode signal, the custom mode being operative to retrieve a data from the shiftpoint map and process the retrieved data and the parameter signal to produce a transmission control signal; and controlling the transmissions gear ratio in response to the transmission control signal.

29. A method as set forth in claims 28 wherein the parameter signal is responsive to transmission input speed.

30. A method as set forth in claims 28 wherein the parameter signal is responsive to transmission output speed.

31. A method for use in a vehicle having an engine driven transmission which includes plurality of gear ratios, a speed sensor adapted to sense a parameter indicative of vehicle speed and responsively produce a vehicle speed signal, default and custom shiftpoint maps which are adapted to provide upshift and downshift speeds for each gear ratio, a gear selector movable to a plurality of locations for indicating a desired gear ratio signal, and a sensor adapted to sense the position of the gear selector and produce a desired gear ratio signal, comprising the steps of:

controllably producing one of an automode, a custommode and a programmode signals;

operating in an automatic mode in response to the automode signal, the automatic mode being operative to retrieve the upshift and downshift speeds for the current gear ratio from the default shiftpoint map and process the retrieved speeds and a signal responsive to the vehicle speed signal to produce a transmission control signal;

operating in a program mode in response to programmode signal is received, the program mode being operative to record a signal responsive to the vehicle speed signal for each upshift and downshift which occurs, produce average upshift and downshift speed signals responsive to averages of the recorded signals for each gear ratio, and update the custom shiftpoint map with the average upshift and downshift speed signals;

operating in a custom mode in response to the custommode signal, the custom mode being operative to retrieve upshift and downshift speeds for the current gear ratio from the custom shiftpoint map and process the retrieved speeds and a signal responsive to the vehicle speed signal to produce a transmission control signal; and controlling the transmission gear ratio in response to the transmission control signal.

\* \* \* \* \*